(12) United States Patent
Cattabriga et al.

(10) Patent No.: US 9,540,130 B2
(45) Date of Patent: Jan. 10, 2017

(54) DEVICE FOR FEEDING SELF-ADHESIVE OR "PRESSURE SENSITIVE" LABELS TO A LABELLING MACHINE

(71) Applicant: KOSME S.R.L. UNIPERSONALE, Roverbella (IT)

(72) Inventors: Denis Cattabriga, Castiglione Delle Stiviere (IT); Giovanni Saccardi, Malavicina di Roverbella (IT); Roberto Busi, Virgilio (IT); Alberto Zamboni, Verona (IT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 4 days.

(21) Appl. No.: 14/397,032

(22) PCT Filed: Feb. 18, 2013

(86) PCT No.: PCT/IB2013/051299
§ 371 (c)(1),
(2) Date: Oct. 24, 2014

(87) PCT Pub. No.: WO2013/164702
PCT Pub. Date: Nov. 7, 2013

(65) Prior Publication Data
US 2015/0136332 A1 May 21, 2015

(30) Foreign Application Priority Data

May 4, 2012 (WO) .................. PCT/IT2012/000129

(51) Int. Cl.
*B32B 38/10* (2006.01)
*B65C 9/00* (2006.01)
(Continued)

(52) U.S. Cl.
CPC ............ *B65C 9/0006* (2013.01); *B65C 9/1892* (2013.01); *B32B 38/10* (2013.01); *B32B 43/006* (2013.01);
(Continued)

(58) Field of Classification Search
CPC ....... B65H 75/00; B65H 75/34; B65H 16/005; B65H 16/02; B65H 67/02; B32B 38/10; B32B 43/006; Y10T 156/1195; Y10T 156/1994
(Continued)

(56) References Cited

U.S. PATENT DOCUMENTS 3,531,057 A * 9/1970 Way .................. A47K 10/3836
242/410
5,478,159 A * 12/1995 Schneider ............... F16D 7/025
192/56.1
(Continued)

FOREIGN PATENT DOCUMENTS

EP 1619129 A1 1/2006
EP 2368803 A2 9/2011
(Continued)

*Primary Examiner* — Mark A Osele
*Assistant Examiner* — Nickolas Harm
(74) *Attorney, Agent, or Firm* — Pearne & Gordon LLP (57) ABSTRACT

A device (1) for feeding self-adhesive or "pressure sensitive" labels to a labelling machine comprises a frame (2) and supporting means (3) comprising a supporting plate (17) for supporting a reel (4) of web (5) with labels applied to it, and also comprises at least one guide element (28, 29) designed to be at least partly inserted in a central hole (7) of the reel (4) which can rotate about it. The device (1) also comprises a detaching station (8) for detaching the labels from the web (5), feeding means (9) for feeding the web (5) to the detaching station (8) and recovery means (10) for recovering the web (5) without labels. The supporting plate (17) is removably associated with the frame (2) and the supporting (Continued)

means (3) also comprise a containment head (30) switchable between an open configuration, in which it allows the coupling with and uncoupling from the frame (2) of the supporting plate (17), with the reel (4) placed on it, and an operating configuration, in which it allows the reel (4) to be held between itself and the supporting plate (17), allowing reel (4) rotation.

24 Claims, 8 Drawing Sheets

(51) Int. Cl.
    *B65C 9/18*         (2006.01)
    *B65H 67/02*       (2006.01)
    *B65H 16/00*       (2006.01)
    *B65H 16/02*       (2006.01)
    *B32B 43/00*       (2006.01)
    *B65H 75/00*       (2006.01)
    *B65H 75/34*       (2006.01)

(52) U.S. Cl.
    CPC ............. *B65H 16/005* (2013.01); *B65H 16/02* (2013.01); *B65H 67/02* (2013.01); *B65H 75/00* (2013.01); *B65H 75/34* (2013.01); *Y10T 156/1195* (2015.01); *Y10T 156/1994* (2015.01)

(58) Field of Classification Search
    USPC ............... 156/247, 277, 425, 426, 506, 543, 719, 156/767; 400/207; 242/335, 338, 338.2, 339, 242/348, 601
    See application file for complete search history.

(56) References Cited

U.S. PATENT DOCUMENTS

| | | | | |
|---|---|---|---|---|
| 6,130,699 | A * | 10/2000 | Christensen | B41J 15/02 347/218 |
| 6,520,696 | B2 * | 2/2003 | Huss | B41J 3/4075 400/207 |
| 2003/0071159 | A1 * | 4/2003 | Hiraguchi | G11B 23/037 242/348.2 |
| 2004/0159402 | A1 | 8/2004 | Poole et al. | |
| 2005/0036816 | A1 | 2/2005 | Carriere et al. | |
| 2005/0152732 | A1 | 7/2005 | Bandholz et al. | |
| 2007/0137454 | A1 * | 6/2007 | DesRosiers | B26D 1/045 83/614 |
| 2007/0235120 | A1 | 10/2007 | Poole et al. | |
| 2010/0247209 | A1 * | 9/2010 | Yamaguchi | B41J 15/044 400/207 |
| 2012/0027485 | A1 * | 2/2012 | Suva | B41J 3/36 400/207 |

FOREIGN PATENT DOCUMENTS

| | | |
|---|---|---|
| WO | 2010041350 A1 | 4/2010 |
| WO | 2011018805 A1 | 2/2011 |

* cited by examiner

DEVICE FOR FEEDING SELF-ADHESIVE OR "PRESSURE SENSITIVE" LABELS TO A LABELLING MACHINE

This invention relates to a device for feeding self-adhesive or "pressure sensitive" labels to a labelling machine.

In particular it relates to those devices in which labels are moved while attached to a web that is wound to form a reel, supported by supporting means, which is then unwound. Of particular interest are those devices which use feeding means to feed the labels attached to the web to a station fordetaching the labels from the web, where the labels definitively leave the device and are passed on to a labelling machine which applies them, for example, on bottles. The web without labels is then recovered by recovery means so that, for example, it can be rewound to form a reel of web without labels on it or collected loose in a container, or milled. An example of such a type of device is provided in patent application EP 1619129 by the same Applicant.

However, this prior art technology has several disadvantages.

At present, in the prior art devices, the supporting means comprise a supporting plate (usually having the shape of a disk) mounted on the device frame, on which the reel of web with labels on it is positioned. In particular, on top of the supporting plate there is a substantially flat sustaining surface and the supporting plate has a central pin whose length is normally greater than the maximum thickness of the reel (width of the web), the pin being designed to be inserted in the central hole in the reel so as to guide the reel in its rotation about the pin following unwinding of the web. For that purpose the pin has a cross-section which is practically equal to that of the central hole in the reel. Therefore, in the prior art machines, the operator, when substituting a reel, takes the finished reel off the pin to remove it from the supporting plate, then fits a new reel in such a way that the pin is inserted in the central hole, until the reel is resting on the sustaining surface.

During this type of operation the operator must be extremely careful to prevent the reel from coming undone transversally to its radial extension (where "coming undone" refers to misalignment, parallel with the winding axis, of two or more adjacent coils of the reel relative to one another).

However, reels are difficult to handle even due to their weight. In fact, the high operating speeds of prior art devices require frequent substitution of the reel of web with labels on it, and at the same time require an increasingly long web. Each reel of this type may therefore weigh several kilograms, even up to 15 kg, which, as indicated, makes it difficult for an operator to handle.

Since devices of this type are installed in labelling apparatuses considerably high off the ground (around 1.3 m to 1.5 m), compared with the height of a person, the operator must often lift the reel even above shoulder height, so as to position it correctly on the supporting plate. The presence of the pin, although on one hand it acts as a guide for correct positioning of the reel on the supporting plate, on the other hand increases the overall height to which the reel must be lifted to allow the pin to be inserted in the central hole. Therefore, the operator is forced to perform relatively precise operations while at the same time lifting unsuitable loads.

There are also prior art devices which allow removal of the supporting plate which has a central hole through which the pin mounted on the frame can be inserted, the pin being similar to those described above (therefore extending beyond the maximum height of the reel). Therefore, the supporting plate can be associated with the pin and can be removed from it. In this way, to substitute the reel, the operator can remove the supporting plate from the pin, place it on a work surface, and position a new reel on it there with less difficulty, aligning the central hole of the reel with that of the supporting plate. However, such devices, although on one hand facilitating positioning of the reel on the supporting plate, on the other hand require the operator to lift an even heavier weight, that is to say, equal to the sum of the weights of the reel and of the supporting plate. Moreover, the operator in any case has to lift the supporting plate, carrying the reel, to a considerable height and the presence of the pin contributes to the overall height to which the reel must be lifted in order to allow insertion of the pin in the central hole (of both the reel and the supporting plate).

Moreover, during shifting of the supporting plate, the reel may translate on the sustaining surface, following movements by the operator transporting them, causing consequent misalignment of the central hole of the reel and that of the supporting plate, which would make it impossible to couple the supporting plate with a known type of pin. In that case, the operator would have to reposition the supporting plate on the work table and start the alignment operation again.

Patent application WO 2010/041350 describes a label feeding device in which the reel with the labels on it is positioned with its axis horizontal and is supported by a roller consisting of a retaining plate partly fixed to the shaft of the roller and partly idle. On the plate side, both the shaft and the plate are constrained to the frame of the device from which they cannot be removed, whilst a retaining head can be removably fixed to the other end of the shaft. In this case too, the shaft extends with a length greater than the maximum thickness of the reel and during installation of a reel the reel must always be fitted on the shaft which remains constrained to the frame, after removing the retaining head. Obviously, in this solution the above-mentioned problems are not encountered, said problems being typical of devices in which the reel is in use supported on a supporting plate which is at least mainly positioned horizontally.

In this context the technical purpose which forms the basis of this invention is to provide a device for feeding self-adhesive or "pressure sensitive" labels to a labelling machine which overcomes the above-mentioned disadvantages.

In particular, it is the technical purpose of this invention to provide a device for feeding self-adhesive or "pressure sensitive" labels to a labelling machine which allows facilitated substitution of the reel of web with labels on it.

It is also the technical purpose of this invention to provide a device for feeding self-adhesive or "pressure sensitive" labels to a labelling machine which allows a reduction of the risk of a new reel accidentally coming undone during the substitution operation.

It is also the technical purpose of this invention to provide a device for feeding self-adhesive or "pressure sensitive" labels to a labelling machine which allows the effort necessary for substituting a reel to be minimised.

It is also the technical purpose of this invention to provide a device for feeding self-adhesive or "pressure sensitive" labels to a labelling machine which allows unsuitable lifting and movement of loads by the operator to be minimised.

The technical purpose specified and the aims indicated are substantially achieved by a device for feeding self-adhesive or "pressure sensitive" labels to a labelling machine as described in the appended claims.

Further features and the advantages of this invention are more apparent in the detailed description, with reference to the accompanying drawings which illustrate several preferred, non-limiting embodiments of a device for feeding self-adhesive or "pressure sensitive" labels to a labelling machine, in which.

With reference to the accompanying drawings the numeral 1 denotes in its entirety a device for feeding self-adhesive or "pressure sensitive" labels to a labelling machine according to this invention.

The device 1 according to this invention comprises a frame 2 which can be coupled with a labelling machine and/or can be rested on the ground, for example by means of suitable supports (not illustrated). The frame 2 is in fact advantageously set up to allow the device 1 to be integrated in a labelling apparatus and in particular to allow device 1 connection to and/or positioning close to a labelling machine.

The device 1 also comprises supporting means 3, mounted on the frame 2, for supporting a reel 4 of web 5, intended to be unwound during operation. In the known way, the reel 4 is formed by winding a web 5 around a winding element 6, there being self-adhesive or "pressure sensitive" labels removably attached to the web; the reel 4 having a central through hole 7 defined by the winding element 6. Generally, the reel 4 is in fact wound around a hollow cylinder which forms the above-mentioned winding element 6. However, in other cases, the web 5 could be wound around an element that is not hollow, but which instead has recesses, one on each of the two faces of the reel 4, and aligned along a line perpendicular to the radial extension of the reel 4. According to the inventive concept of this invention, reference is therefore made to the central hole 7 of the reel 4 also comprising similar ideas such as that indicated above, but without limiting the scope of the invention.

The device 1 also comprises a detaching station 8 for detaching the labels from the web 5, associated with the frame 2. At the detaching station 8 the labels definitively leave the device 1 so that they can be passed on to a labelling machine which will apply them, for example, on bottles.

The device 1 also comprises feeding means 9 for feeding the web 5 to the detaching station 8 and recovery means 10 for recovering the web 5 without labels from the detaching station 8, both associated with the frame 2.

The web 5 runs along a path extending from the supporting means 3 to the recovery means 10, passing through the detaching station 8 and advantageously through a plurality of rollers 11 (for example idle) and/or tilting elements 12 (substantially in the known way).

Figure 11:
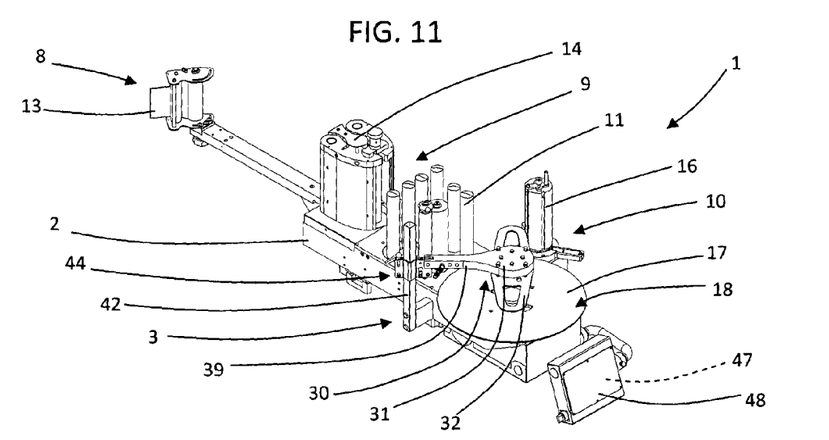
FIG. 11 is an axonometric top view from a different angle of the device of FIG. 1 in which the reel being unwound and the web have been removed.

In a substantially known way, at the detaching station 8 there is a sudden change of direction in the path of the web 5, causing the self-adhesive or "pressure sensitive" labels to be detached from the web 5. The sudden change of direction in the path may be caused, as shown in FIG. 11, by a blade 13 (for a similar but more detailed example consult patent application EP 1619129). The self-adhesive or "pressure sensitive" labels detached in this way cab be passed on to a labelling machine which will apply them on relevant objects, for example, bottles.

Web 5 feeding to the detaching station 8 is guaranteed and can be synchronised with the other parts that make up a labelling apparatus by the web 5 feeding means 9. Advantageously, the feeding means 9 are made in such a way that they feed the web 5 to the detaching station and at the same time remove an equal quantity of it from said station.

The feeding means 9 may generally be of any kind and can be positioned at any point along the running path. In the embodiments illustrated the feeding means 9 in the known way comprise a motor-driven central roller 14 which allows the web 5 to be drawn by contact, during roller rotation, from and towards the detaching station 8. Also advantageously, the feeding means 9 comprise at least two idle counter-pressure rollers which respectively keep the web 5 which is moving towards the detaching station 8 and the web 5 coming away from the detaching station 8, substantially pressed against the motor-driven central roller 14. Therefore, rotating about its axis, the motor-driven central roller 14 simultaneously draws the web 5 with the labels on it towards the detaching station 8 and the web 5 without labels towards the recovery means 10, substantially in the known way. A more detailed example of such feeding means 9 is provided in patent application EP 1619129.

The web 5 without labels is then advantageously rewound to form a recovery reel 15 by a rewinding roller 16 which is part of the recovery means 10. In the preferred embodiments the rewinding roller 16 is advantageously motor-driven in such a way as to guarantee correct rewinding of the web 5, substantially in the known way.

Moving on to a more detailed description of the supporting means 3, to which this invention relates in particular, these comprise a supporting plate 17 on top of which there is a substantially flat sustaining surface 18, on which the reel 4 can be placed. Advantageously, the supporting plate 17 has the shape of a flat disk and the sustaining surface 18 is suitable for accommodating reels 4 of different sizes in terms of the radius and height/thickness. In other words, the supporting plate 17 is, advantageously, a reel-holder plate. In fact, this invention is advantageously intended to be applied in feeding devices 1 in which, in use, the supporting plate 17 is associated with the frame in such a way that its sustaining surface 18 extends at least mainly horizontally (that is to say, in such a way that the area of its projection in a horizontal plane is greater than the area of its projection in a vertical plane).

The supporting plate 17 is removably associated with the frame 2. In particular, the supporting plate 17 can be positioned on the frame 2 (Figures from 1 to 4, 12, 13 and 16) and then removed from it (Figures from 5 to 7, 14, 15, 17 and 18).

Advantageously, the supporting means 3 comprise connecting means 19 associated with the supporting plate 17, and the device 1, at the frame 2, comprises receiving means 20 for receiving the connecting means 19 which can be coupled with and uncoupled from the receiving means 20, allowing the supporting plate 17 to be coupled with and uncoupled from the frame 2. Advantageously, the connecting means 19 comprise one or more connecting elements 21 and the receiving means 20 form one or more seats 22 for the connecting elements 21 which are therefore advantageously insertable in the respective one or more seats 22.

Figure 8:
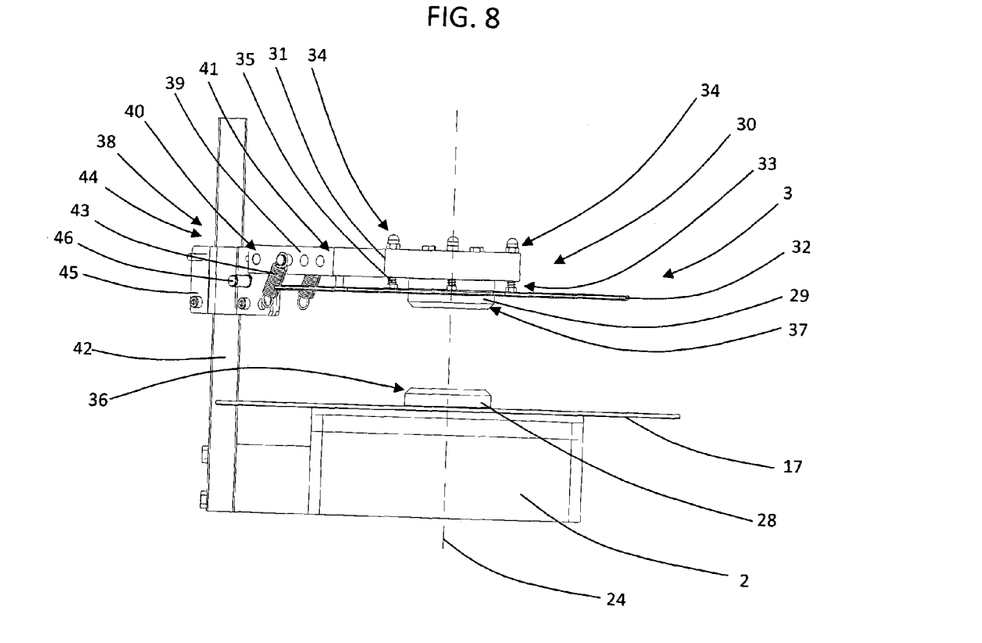
FIG. 8 is a schematic front view of a part of the device of FIG. 1 without the web and reels, with some parts removed for simplicity.
Figure 9:
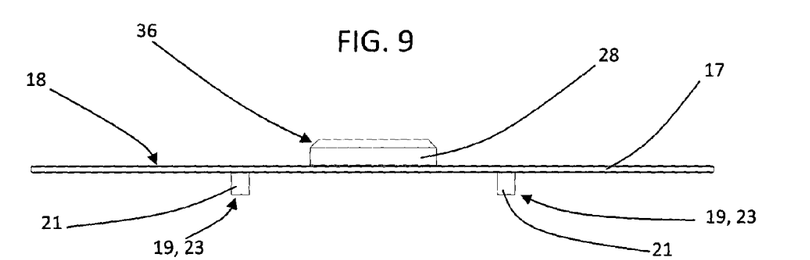
FIG. 9 is a front view of the supporting plate for the reel to be unwound of the device of FIG. 1.

In the embodiments illustrated, the supporting means 3 comprise prevention means 23 for preventing the rotation of the supporting plate 17 (FIG. 9). Therefore, the supporting plate 17 remains stationary relative to the frame 2 and, during operation, the reel 4 of web 5 with labels on it can be substantially unwound in the known way, by making it rotate about an axis of rotation 24 (FIG. 8), substantially defined at its own central hole 7, sliding on the sustaining surface 18. Advantageously, in these embodiments the connecting means 19 form the rotation prevention means 23 (FIG. 9). In particular, in the embodiments illustrated in the accompanying drawings, the connecting means 19, which form the rotation prevention means 23, comprise two connecting elements 21 which are substantially two cylindrical pegs descending from the supporting plate 17 and in particular descending perpendicularly from the opposite face to that on which the sustaining surface 18 is located (FIG. 9). The receiving means 20 in this case substantially comprise two seats 22 made in the frame 2, (advantageously, each is a hole, circular in FIG. 6, designed to accommodate the two cylindrical pegs). The presence of two cylindrical pegs and the positioning of at least one off centre relative to the axis of rotation 24 allowing rotation of the supporting plate 17 to be prevented and therefore allowing the plate to be held stationary relative to the frame 2. Obviously, the rotation prevention means 23 (and the connecting means 19) may also be of other types. For example, they may comprise a single connecting element 21 which is a pin descending from the supporting plate 17, substantially as described for the circular pegs, shaped in such a way that it cannot rotate in the seat formed by the receiving means 20, advantageously consisting of a hole shaped to match the shape of the pin (solution not illustrated). In simple terms, it is even sufficient only that the connecting element 21 and the seat do not have a circular cross-section.

In a different embodiment, not illustrated, the supporting means 3 comprise rotation means associated between the frame 2 and the supporting plate 17 for allowing rotation of the latter about an axis of rotation 24 (visible in FIG. 8), that is to say, an axis which in use corresponds to that passing through the central hole 7 of the reel 4 and perpendicular to the sustaining surface 18. In that way, as it is unwound, the reel 4 moves as one with the supporting plate 17 in its rotary movement. In this case, the connecting means 19 may form the rotation means. For example, the connecting means 19 may comprise a connecting element 21 advantageously in the form of a cylindrical pin descending from the supporting plate 17 centrally and perpendicularly to the sustaining surface 18. The pin may rotate in a suitable seat 22 formed by the receiving means 20.

Figure 10:
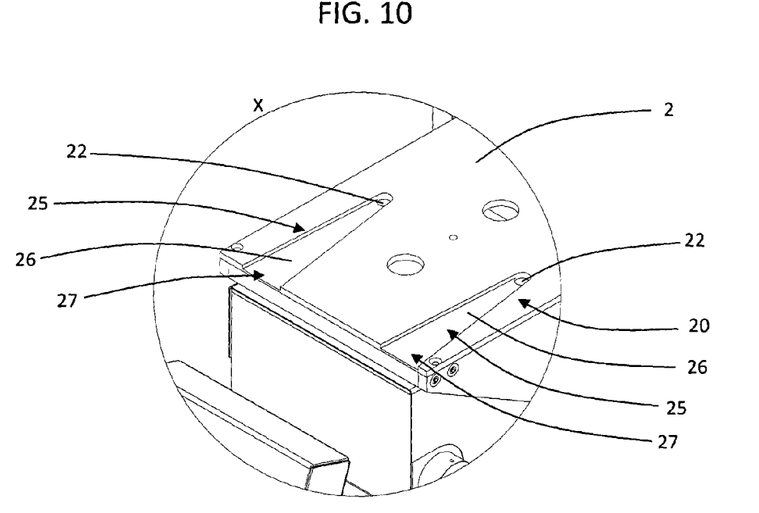
FIG. 10 shows an alternative embodiment of the detail X of FIG. 6.

In the alternative embodiment illustrated in FIG. 10, the device 1 also comprises insertion guide means 25, associated with the frame 2, for guiding the association of the supporting plate 17 with the frame 2 (FIG. 10). In particular, advantageously, the insertion guide means 25 can guide the sliding of the connecting means 19 on the frame 2, at least during coupling with the receiving means 20. Advantageously, the insertion guide means 25 can guide the sliding of the connecting means 19 even during uncoupling from the receiving means 20. In the preferred embodiments, the insertion guide means 25 are substantially designed to facilitate positioning of the supporting plate 17 and in particular to facilitate coupling between the connecting means 19 and the receiving means 20, during reel 4 substitution. Basically, in the preferred embodiments, the supporting plate 17 can be made to slide on the frame 2, using the insertion guide means 25, until it is coupled with it. The supporting plate 17 can therefore first be placed on the frame 2, with the connecting means 19 not necessarily at the receiving means 20, and can then be pushed to perform a movement guided by the insertion guide means 25, until the connecting means 19 are coupled with the receiving means 20.

Advantageously, on the frame 2 the insertion guide means 25 form one or more guides 26 in each of which a different connecting element 21 can slide respectively until it reaches the respective seat 22 (formed by the receiving means 20). In particular, even more advantageously, the seats 22, the connecting elements 21 and the guides 26 are present in equal numbers. In other words, each connecting element 21 can slide in a respective guide 26 until it is associated with a respective seat 22. For example, in the case in which the connecting means 19 form the rotation prevention means 23 according to the embodiments referred to above, and the connecting elements 21 are the two cylindrical pegs which are inserted in the two seats 22 consisting of the circular holes, the insertion guide means 25 form two guides 26, one for each cylindrical peg, which from a resting zone guide the cylindrical pegs in the movement to the circular holes, where the supporting plate 17 is coupled with the frame 2 ciruclar Advantageously, at its initial portion 27 (that is to say, at the resting zone), each guide 26 forms an insertion guide for a connecting element 21'. For example, the guide 26 has an initial portion 27 which is wider than the width of the connecting element 21, and whose width is then reduced gradually towards the seat 22.

Returning to the description of the supporting means 3, these also comprise at least one guide element 28, 29 for the reel 4 (two in the accompanying drawings, clearly visible in FIGS. 8 and 16) which defines the axis of rotation 24 for the reel 4 perpendicular to the sustaining surface 18. The guide element 28, 29 is suitable for insertion in the central hole 7 of the reel 4 for guiding its rotation about the axis of rotation 24. Depending on the embodiment, as already indicated, the rotation of the reel 4, guided by the guide element 28, 29 about the axis of rotation 24, may occur by sliding on the sustaining surface 18, if the supporting means 3 comprise the rotation prevention means 23, or by rotation of the supporting plate 17, if the supporting means 3 comprise the rotation means.

The guide element 28, 29 basically allows the reel 4 to not translate on the sustaining surface 18 in a radial direction relative to the axis of rotation 24, at least during rotation of the reel 4. The guide element 28, 29 acts as a centring element for the reel 4 on the supporting plate 17, in such a way that it defines the axis of rotation 24 of the reel 4. In the preferred embodiments, unlike the prior art devices, the guide element 28, 29 is preferably only partly inserted in the central hole 7. Moreover, the guide element 28, 29 may remain stationary, or may rotate about the axis of rotation 24 which it defines, moving as one with the reel 4.

Moreover, according to this invention, the supporting means 3 comprise a containment head 30 switchable between an open configuration (FIGS. 3 to 7, 13, 14 and 17), in which in use it allows the coupling with and uncoupling from the frame 2 of a supporting plate 17 carrying a reel 4, and an operating configuration (FIGS. 1, 2, 8, 11 and 12), in which it allows the reel 4 to be held between itself and the supporting plate 17, in any case allowing reel 4 rotation guided by the guide element 28, 29 (by the guide elements in the accompanying drawings).

When the containment head 30 is in the operating configuration, it allows the reel 4 to be kept coupled with the supporting plate 17 (at the sustaining surface 18), allowing its rotation, guided (or radially constrained) by the guide element 28, 29, by sliding on the sustaining surface 18 or by rotation of the supporting plate 17.

In contrast, when the containment head 30 is in the open configuration, it allows coupling and uncoupling of the supporting plate 17, carrying the reel 4 placed on the sustaining surface 18, with/from the frame 2, substantially as described above (to be precise, in the third embodiment described below, said movement is even possible with the containment head 30 in the operating configuration). Moreover, advantageously, in the open configuration the containment head 30 also allows the positioning of a reel 4 on the supporting plate 17 and/or its removal.

Figure 1:
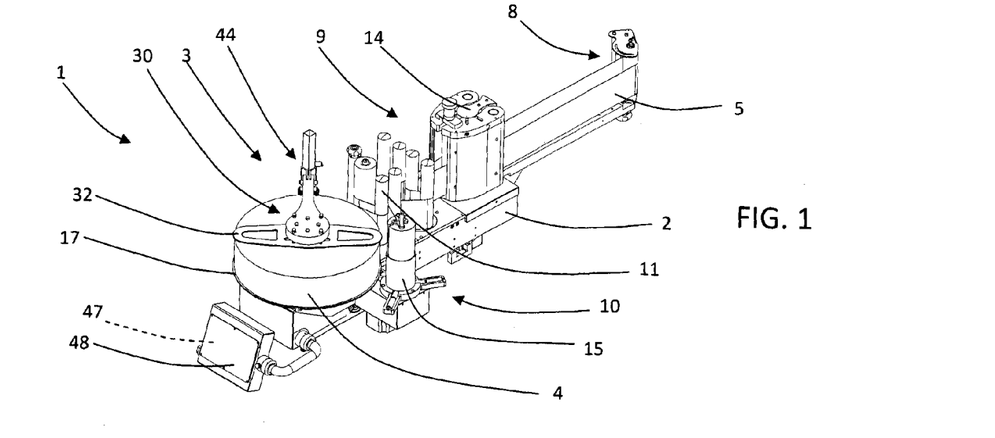
FIG. 1 is an axonometric top view of a device, according to a first embodiment of this invention, in a first configuration and with a reel of web being unwound and a recovery reel being rewound.

In the embodiments illustrated (FIGS. 1 and 8), when the containment head 30 is in the operating configuration, it allows the reel 4 to be held between itself and the supporting plate 17. Advantageously, the containment head 30 comprises a contact element 32 which, when the containment head 30 is in the operating configuration, extends radially outwards from the axis of rotation 24, is substantially parallel with the sustaining surface 18 (at least at a flat portion of it facing towards the sustaining surface 18) and is distanced from it so as to contain the reel 4 between itself and the sustaining surface 18, substantially preventing reel 4 movements along a line perpendicular to the sustaining surface 18, but at the same time leaving it free to rotate (FIG. 1). Substantially, the contact element 32 prevents the reel 4 from coming undone along a line at a right angle to the sustaining surface 18. Advantageously, when reel 4 unwinding occurs by its sliding on the sustaining surface 18, the contact element 32 also allows the reel 4 to be pressed against the supporting plate 17 in such a way as to regulate the friction between them for applying a braking action to the reel 4 unwinding. In particular, by pressing the reel 4 against the supporting surface 17, the contact element 32 allows, in the event of sudden stops by the feeding means 9, the stopping of reel 4 rotation caused by inertia.

In the embodiment illustrated the contact element 32 extends substantially in a plane and comprises a substantially flat face designed to be positioned facing towards the reel 4 at least when the containment head 30 is in the operating configuration.

The distance between the contact element 32 and the reel 4, therefore advantageously the distance between the containment head 30 and the reel 4 when the containment head 30 is in the operating configuration, is adjustable. In any case, advantageously, the distance between the contact element 32 and the reel 4 will be selected in such a way as to allow reel 4 rotation and at the same time to prevent the reel from coming undone. According to the preferred embodiments illustrated, the supporting means 3 comprise both a first guide element 28 and a second guide element 29 which are aligned with each other according to the axis of rotation 24 (which both define), at least when the containment head 30 is in the operating configuration.

The first guide element 28 is operatively associated with the supporting plate 17 and in particular on the sustaining surface 18. The first guide element 28 advantageously projects from the sustaining surface 18 (advantageously in the direction defined by the axis of rotation 24) and is designed to be inserted in the central hole 7 of the reel 4 (at least when the reel is placed on the sustaining surface 18). In the preferred embodiment the sustaining surface 18 is circular and the first guide element 28 is positioned centrally relative to it. Advantageously, as illustrated in FIGS. 4 to 6 and 8, the first guide element 28 substantially forms, relative to the sustaining surface 18, a step whose cross-section (according to a plane parallel with the sustaining surface 18) is designed to be inserted in the central hole 7 of the reel 4, and which advantageously is circular (FIG. 8). Advantageously, the first guide element 28 also comprises, at its part furthest from the supporting plate 17, a first insertion guide portion 36 where the radius of the cross-section of the guide element 28, 29 is reduced moving away from the sustaining surface 18, to promote insertion of the first guide element 28 in the central hole 7 of the reel 4. As described in more detail below, the first guide element 28 may also either be fixed to the supporting plate 17, or not fixed to it.

Figure 7:
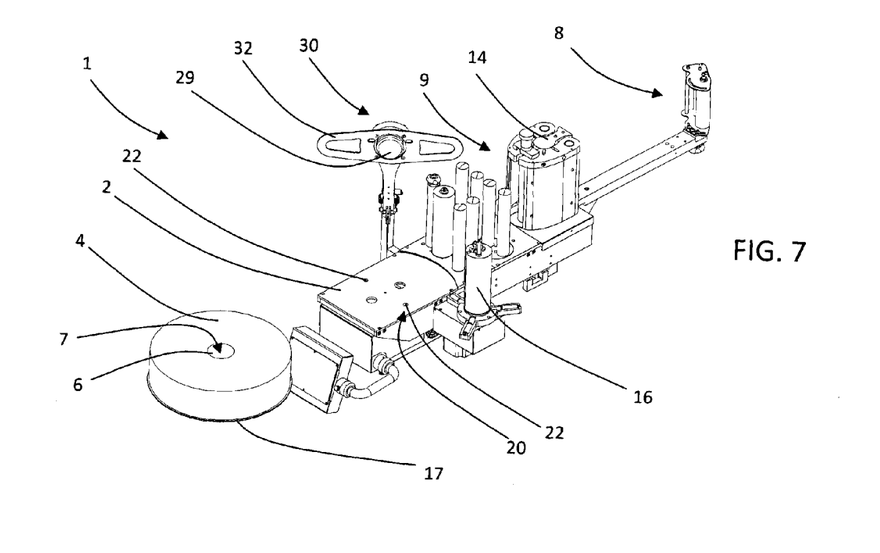
FIG. 7 shows the device of FIG. 6 in which a new reel of web is positioned on the supporting plate.

The supporting plate 17 may be associated with the frame 2 with a reel 4 of web 5 (advantageously new) with labels on it already placed on the sustaining surface 18 (FIG. 7). In this way, positioning a reel 4 on the supporting plate 17 does not necessarily have to take place when the supporting plate 17 is mounted on the frame 2, but instead may occur in a position that is more convenient for an operator, for example, on a work table. Consequently the reel 4 may be positioned on the supporting plate 17, at the sustaining surface 18, with greater precision and less effort by an operator. Moreover, if the first guide element 28 is fixed to the supporting plate 17 it acts as a centring element for positioning the reel 4 on the supporting plate 17, whilst if it is fixed to the frame 2, it can act as a centring element either for the supporting plate 17 alone or for the assembly consisting of the supporting plate 17 and the reel 4. In the former case the reel 4 can in fact always be placed on the surface in the correct position by simply positioning the central hole 7 at the first guide element 28. The supporting plate 17 carrying the reel 4 can then be transported towards the frame 2 and associated with it without the danger of misalignments and incorrect positioning. In contrast, in the latter case the reel 4 is positioned on the supporting plate 17 by substantially aligning the central hole 7 with an opening 53 made centrally in the supporting plate 17. When the supporting plate 17 with the reel 4 is positioned on the frame, the first guide element 28 is inserted in the opening 53 and in the central hole 7 thereby centring all of the parts. Moreover, to speed up reel 4 substitution times, the device 1 may comprise an additional supporting plate 17, on which a new reel 4 can advantageously already have been prepared (most likely during device 1 operation). In that way, when one reel 4 finishes, one supporting plate is uncoupled from the frame 2 and another, already made ready, can immediately be coupled.

Figure 16:
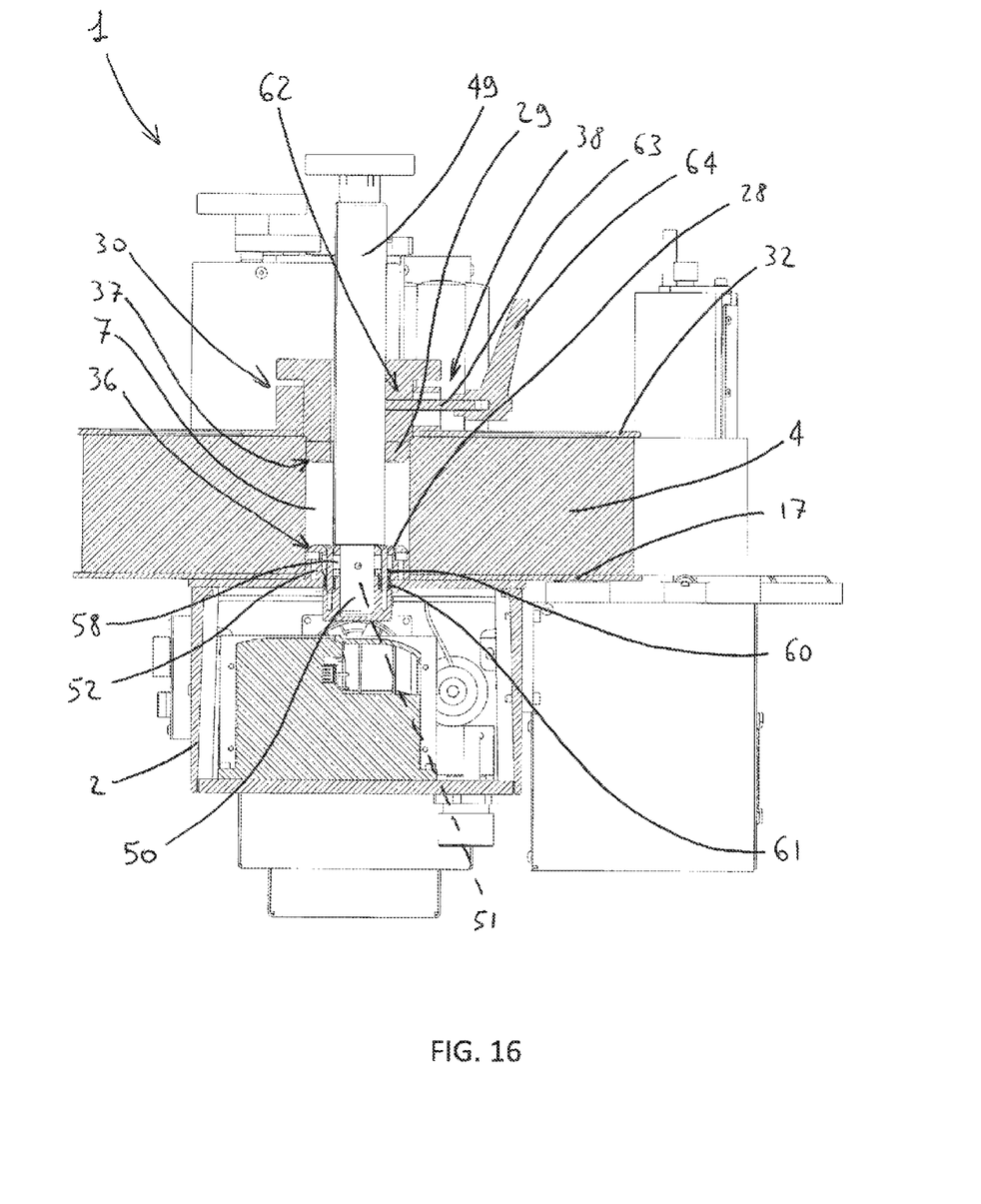
FIG. 16 is a vertical cross-section according to the line XVI-XVI of the device of FIG. 12.

In contrast, the second guide element 29 is associated with the containment head 30, and is designed to be inserted, when the containment head 30 is in the operating configuration, in the central hole 7 on the opposite side of the reel 4 to that where the sustaining surface 18 is located. In particular, the second guide element 29 also defines the axis of rotation 24 in the operating configuration. In the preferred embodiments the second guide element 29 projects relative to the contact element 32 towards the supporting plate 17 (when the containment head 30 is in the operating configuration). In other words, the second guide element 29 projects relative to the face of the contact element 32 designed to face towards the reel 4 when the containment head 30 is in the operating configuration. In fact, advantageously, as shown in FIGS. 8 and 16, the second guide element 29 is surrounded by the contact element 32.

Similarly to what was described with reference to the first guide element 28, the second guide element 29 substantially forms a step (relative to the contact element 32) whose cross-section (according to a plane parallel with the sustaining surface 18, when the containment head 30 is in the operating configuration) is designed to be inserted in the central hole 7 of the reel 4, the cross-section advantageously being circular. Similarly to the first guide element 28, the second guide element 29, at its part closest to the supporting plate 17 when the containment head 30 is in the operating configuration, comprises a second insertion guide portion 37. Again in this case, the second guide element 29 can rotate about the axis of rotation 24, and therefore may substantially rotate as one with the reel 4, or it may be stationary.

In other embodiments alternative to those just described, there may be either only the first guide element 28 associated with the supporting plate 17, or only the second guide element 29 associated with the containment head 30.

Advantageously, the position of the containment head 30 may be varied relative to the frame 2 using positioning means 38.

In fact, advantageously in the preferred embodiments the supporting means 3 comprise positioning means 38 for the containment head 30.

Advantageously, the supporting means 3 comprise adjusting means 44 for adjusting the distance of the containment head 30 from the sustaining surface 18 when the containment head 30 is in the operating configuration. The distance adjusting means 44 are also part of the containment head 30 positioning means. In particular, when the containment head 30 is in the operating configuration, the distance adjusting means allow the position of the containment head 30, and in particular its position relative to the sustaining surface 18, to be adjusted along a line parallel with that defined by the axis of rotation 24.

The device 1 also advantageously comprises at least a control unit 47 and a control panel 48 which is operatively connected to it. The control unit 47, in the known way, is connected to the feeding means 9, the recovery means 10 and the feeding means 9. The control unit determines in particular operation of the feeding means 9, and the relative speed of movement of the web 5, and it can be interfaced to also control synchronisation with the other elements which are part of the labelling apparatus and in particular with the labelling machine.

Figure 2:
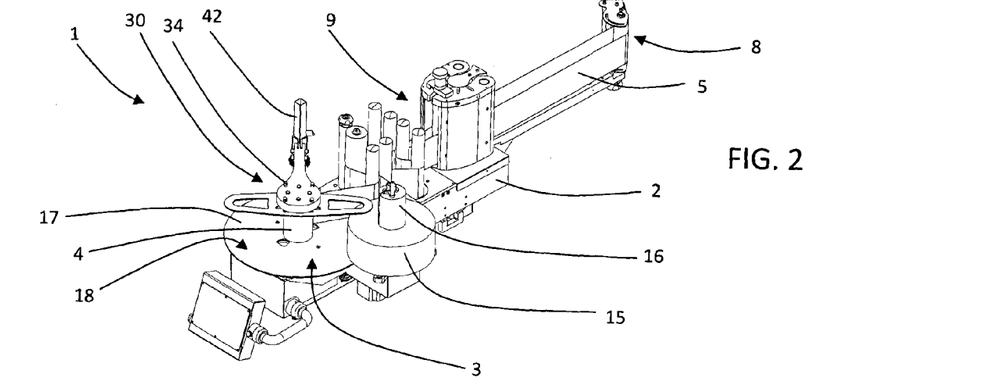
FIG. 2 shows the device of FIG. 1 with the reel of web being unwound almost finished and with the reel of web being wound full.

As already indicated, the accompanying drawings show three different embodiments of this invention, which differ mainly as regards the containment head 30 and its functional relationship with the supporting plate 17. The differences between the three embodiments will be described below. According to the first embodiment of this invention (FIGS. 1 to 8), the containment head 30 is associated with the frame 2 and is movable relative to it between an open position (FIGS. 3 to 7) and an operating position (FIGS. 1, 2 and 8). In this embodiment the open configuration coincides with the open position and the operating configuration coincides with the operating position.

In the accompanying drawings, in particular, the containment head 30 advantageously comprises a load-bearing part 31 which can be connected to the frame 2.

Advantageously, in this embodiment the contact element 32 is mounted on the load-bearing part 31 of the containment head 30 using elastic means 33 which allow, once the position of the containment head 30 has been fixed, elastic variation of the distance between the contact element 32 and the load-bearing part 31 under the action of an external thrust acting on the contact element 32 (on the face designed to be facing the reel 4) substantially along the line defined by the axis of rotation 24 (FIG. 8). In the preferred embodiment the elastic means 33 advantageously comprise a plurality of bolts 34 mounted through the load-bearing part 31 and fixed to the contact element 32, and a spring 35, wound around the screw shank of each bolt 34, and which can be compressed between the load-bearing part 31 and the contact element 32 (FIG. 8). In this way the contact element 32 can advantageously be placed substantially in contact with the reel 4 in such a way that it elastically opposes any jumps by the reel (most likely when it is rotating), substantially along the line defined by the axis of rotation 24, keeping the reel 4 pressed against the supporting plate 17 advantageously generating friction between them as indicated above.

In the first embodiment illustrated, the second guide element 29 is mounted on the load-bearing part 31, is surrounded by the contact element 32, and the radius of the cross-section of its second insertion guide portion 37 decreases moving away from the load-bearing part 31.

In the first embodiment illustrated, the positioning means 38 advantageously consist of an arm 39 associated with the frame 2 and supporting the containment head 30 (clearly visible in FIGS. 8 and 11). The arm 39 is movable relative to the frame 2 between a first position in which the containment head 30 is in the open position (FIGS. 3 to 7), and a second position in which the containment head 30 is in the operating position (FIGS. 1, 2 and 8). In particular, in the preferred embodiment, the arm 39 is rigid and extends, along a main line of extension of the arm 39, between a first end 40 connected to the frame 2 and a second end 41 which is free and supports the containment head 30 (preferably associated at the load-bearing part 31). However, the arm 39 may be composite (comprising two or more rigid elements which are constrained to each other) or it may be shaped in various ways. Moreover, it may be connected to the frame 2 and/or to the containment head 30 in an intermediate position or positions relative to the first end 40 and the second end 41.

Advantageously, in the embodiment illustrated the arm 39 pivots at the frame 2, substantially at the first end 40, and is rotatable about an axis of movement which is substantially parallel with the sustaining surface 18. The arm 39 is also advantageously associated with the frame 2, substantially at the first end 40, by means of a rod 42 associated with the frame 2 which extends substantially along a line parallel with that defined by the axis of rotation 24 (FIG. 8), and with which the first end 40 of the arm 39 is associated. Therefore, in the preferred embodiment the arm 39 is rotatably connected to the rod 42 at the first end 40 and during the passage between the first and second positions it performs a rotation about the axis of movement.

In any case, the arm 39 may in general have several degrees of freedom, but in the embodiment illustrated it can only move in an arm 39 movement plane which is substantially perpendicular to the axis of movement and passing through the axis of rotation 24.

The containment head 30 in particular can substantially perform a rotation, in said arm 39 movement plane, about the axis of movement. As shown for example in FIGS. 3 to 7, in the open position the main line of extension of the arm 39 substantially forms a right angle with the sustaining surface 18. Instead, in the operating position, the main line of extension is substantially parallel with the sustaining surface 18 (FIGS. 8 and 11).

As the arm 39 passes from the first position to the second position, when the second guide element 29 is associated on the containment head 30, the second guide element 29 is substantially inserted in the central hole 7 of the reel 4. However, the movement of the arm 39 could cause difficulty with insertion of the second guide element 29 in the central hole 7, mainly due to its length. To overcome such a disadvantage, for example if construction requirements call for a second guide element 29 whose length is excessive relative to the section of the central hole 7 and movement of the arm 39, the containment head 30 could also vary its own angle relative to the main line of extension of the arm 39, during arm 39 rotation.

Advantageously, keeping the arm 39 in the first and second positions is promoted by the presence of at least one return spring 43, one end of which is associated with the rod 42, and the other end of which is fixed to the arm 39 at an intermediate point between the first end and the second end 41. Advantageously, when the arm 39 is in the first position the return spring 43 applies a force which creates a torque that tends to rotate it towards the first position, whilst when the arm 39 is in the second position the return spring 43 applies a force which creates a torque that tends to rotate it towards the second position.

In alternative embodiments, the arm 39 may in any case be designed to perform different movements. For example, the arm 39 may allow movement of the containment head 30 along a line perpendicular to the sustaining surface 18 and passing through the central hole 7 of the reel 4 when it is placed on the sustaining surface 18. In this case, the arm 39 may advantageously be an extendable actuator (for example pneumatic or hydraulic). Alternatively, to allow the containment head 30 to be shifted between the open position and the operating position, the arm 39 may be slidably associated with one or more rod-shaped supports, so that it can be moved along a line perpendicular to the sustaining surface 18.

Advantageously, in the first embodiment the distance adjusting means 44 are associated between the frame 2 and the arm 39. In particular the adjusting means 44 allow the variation of the position of the arm 39 relative to the frame 2 and consequently the variation of the position of the containment head 30 relative to the sustaining surface 18, especially when the containment head 30 is in the operating position.

Advantageously, the adjusting means 44 comprise the above-mentioned rod 42 associated with the frame 2 and a sliding element 45 slidably associated with the rod 42 and selectively movable on it. The sliding element 45 supports the arm 39, that is to say, the arm 39 is associated with the sliding element 45, advantageously at the first end 40. Moreover, advantageously the sliding element is associated with the end of the return spring 43 associated with the rod 42, in particular at a projecting stud 46 (in the accompanying drawings, and as shown in particular in FIG. 8, the return springs are illustrated disconnected from the projecting stud 46 so that it is more clearly visible).

The sliding element 45, is movable along the rod 42, allows variation of the position of the arm 39 and consequently of the containment head 30. In particular, using the adjusting means 44, the distance between the containment head 30 and the sustaining surface 18 can be varied. In other words, the adjusting means 44 allow modification of the distance between the containment head 30 and the sustaining surface 18, adapting it to the thickness/height of the reel 4 (width of the web 5), thus determining said distance with the containment head 30 in the operating position. The position of the sliding element 45 on the rod 42 may be fixed and adjusted as required.

In an alternative embodiment (not illustrated) the rod 42 is not stationary relative to the frame 2, but instead can move relative to it substantially parallel with the line defined by the axis of rotation 24. In this embodiment the arm 39 is directly fixed to the rod 42 (preferably at the first end 40) or at least moves as one with it, and its position can be varied following movement of the rod 42 relative to the frame 2.

Finally, according to an alternative embodiment of the first embodiment, the positioning means 38 for the containment head 30 may be motor-driven. The arm 39 may in fact be motor-driven or, as indicated, in some embodiments it may be an actuator. In particular, the distance adjusting means 44 may also be motor-driven. Therefore, advantageously, the control unit 47 may also be operatively connected to the positioning means 38 for determining the position of the containment head 30 and in particular for causing, depending on the embodiments, the passage of the operating head between the open position and the operating position, and/or the passage of the arm 39 between the first position and the second position and/or for causing operation of the distance adjusting means 44.

In contrast, according to the second and third embodiments, the containment head 30 is advantageously removable from the rest of the feeding device 1. Since the two embodiments have significant similarities, they will be described in parallel below.

In general, according to the second embodiment illustrated in FIGS. 12 to 16, when the containment head 30 is in the operating configuration it is connected to the frame 2, whilst when it is in the home configuration it is disconnected from the frame. In contrast, according to the third embodiment, the containment head 30 is constrainable only to the supporting plate 17 and in its operating configuration can be coupled with the frame 2, and uncoupled from the frame 2, together with the supporting plate 17.

In both of these embodiments, the supporting means 3 in fact also comprise a bar 49 on which the containment head 30 is mounted, and which has a lower end 50 engagable in a housing 51 which is positioned at the centre of the supporting plate 17 at least when the supporting plate 17 is associated with the frame 2. In use, the bar 49 is also insertable in the central hole 7 of the reel 4 in such a way that its lower end 50 can reach the housing 51 and engage in it. However, the bar 49 has a cross-section which is sufficiently smaller than that of the central hole 7 to allow the bar to be inserted in the hole and removed from it without difficulty. In other words, the bar does not act as a guide element, and the guide elements 28, 29 present are advantageously sized in such a way that each of them can only be inserted in the central hole 7 for a minority stretch of the length of the central hole 7 in such a way as to allow their easy insertion and removal.

In both of these embodiments, the housing 51 is formed by a linking element 52, but, whilst in the second embodiment the linking element 52 is fixed to the frame 2 and in use is insertable in the opening 53 made at the centre of the supporting plate 17, in the third embodiment it is fixed to the supporting plate 17. However, in the second embodiment in order to allow easy positioning of the supporting plate 17 the linking element has a height which is less than half of the length of the central hole 7 of the reel, therefore much less than the prior art pins. However, advantageously, in the preferred embodiments the linking element 52 also constitutes the first guide element 28 (or, depending on the viewpoint, the first guide element 28 constitutes the linking element 52).

Figure 15:
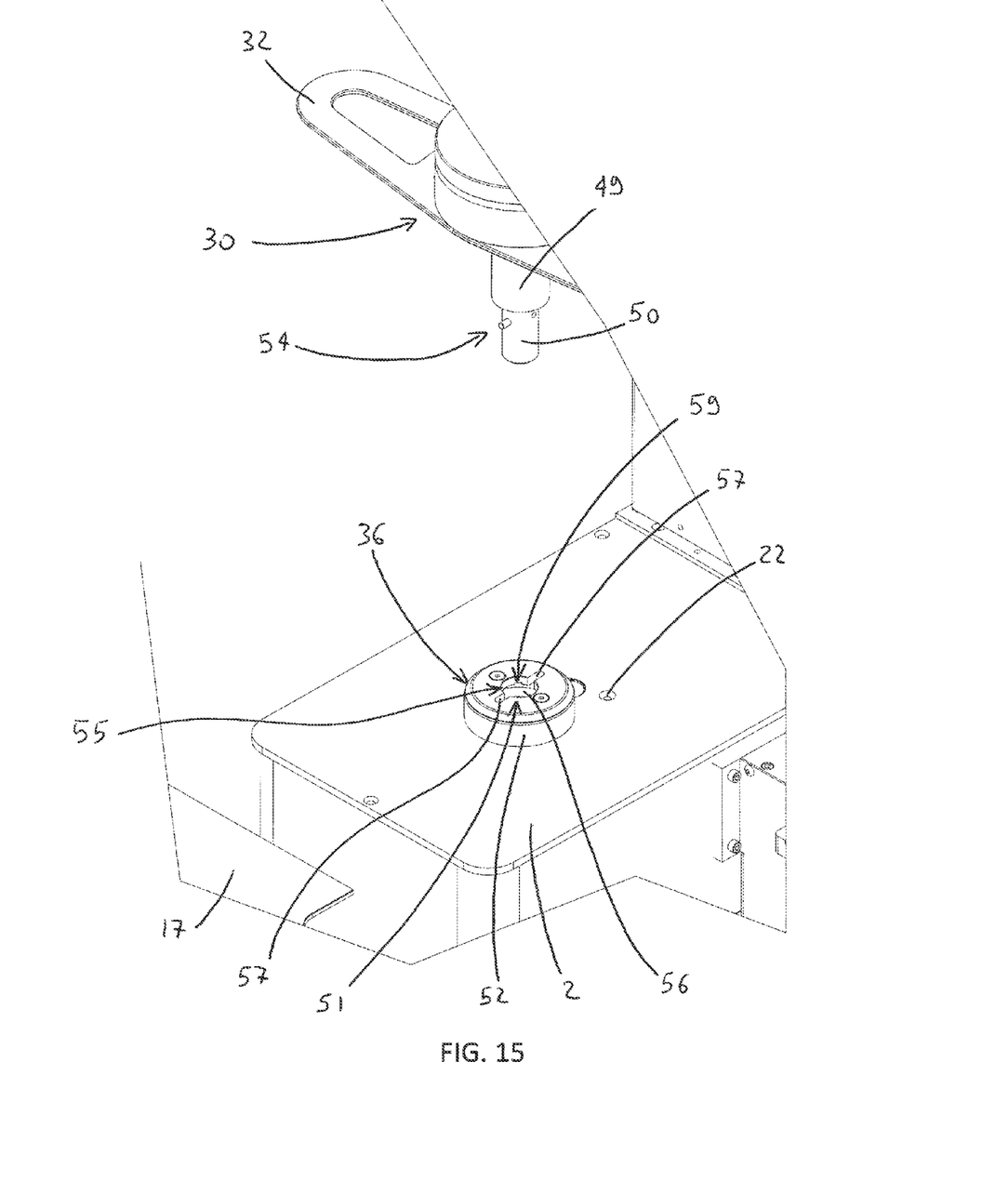
FIG. 15 shows an enlarged detail of the device of FIG. 14 with the parts close together.
Figure 17:
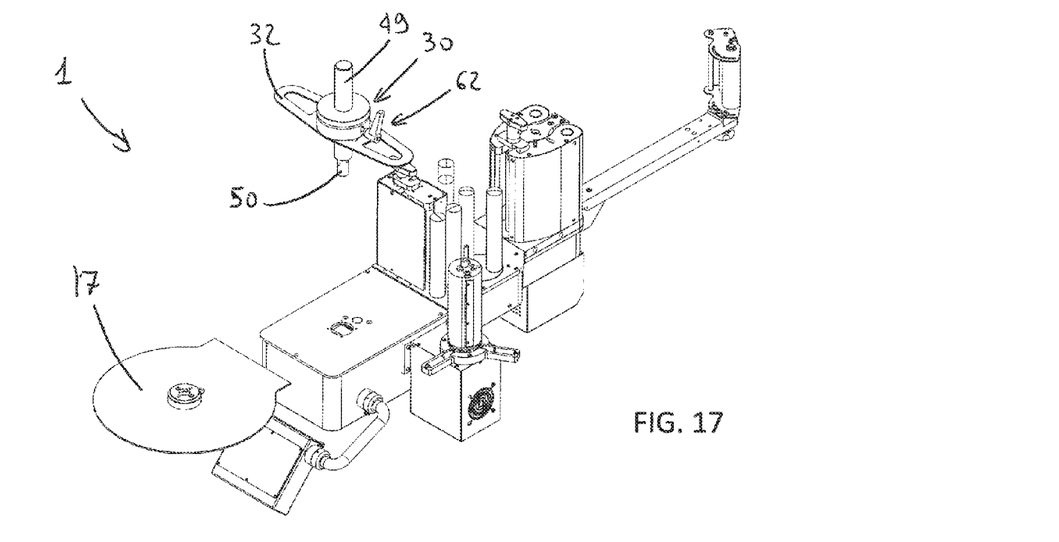
FIG. 17 is an axonometric top view of a device, according to a third embodiment of this invention, in a configuration similar to that of FIG. 14.
Figure 18:
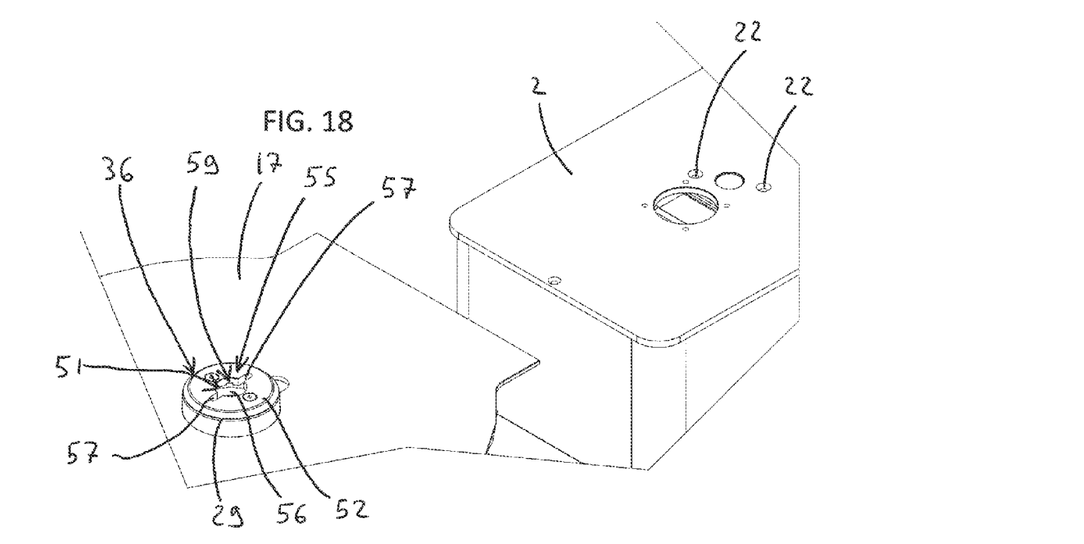
FIG. 18 shows an enlarged detail of the device of FIG. 17.

Preferably, as shown in particular in FIGS. 15 and 17, the lower end 50 of the bar 49 is fixable to the housing 51 by means of a bayonet connector. For that purpose, the lower end 50 of the bar 49 comprises at least one tooth 54 with radial extension (two in the embodiment illustrated in the accompanying drawings) whilst the housing 51 comprises an insertion section 55 having a central part 56 shaped to match the lower end 50 of the bar 49 (circular in the accompanying drawings) and, for each tooth 54 present on the bar 49, radial projections 57 designed to allow insertion of the teeth 54. Below the insertion section 55, the housing 51 comprises a widened area 58 which allows rotation of the bar 49 on itself until each tooth 54 is brought to a notch 59 designed to accommodate it. To guarantee stable hooking, inside the housing 51 there is also an annular plate 60 which is pushed upwards by springs 61, the teeth 54 making contact against the plate once they have been inserted in the housing 51 and the plate therefore guaranteeing that the teeth 54 are kept in the notches 59 by pushing them upwards in the absence of outside stresses.

In the second and third embodiments, the supporting means 3 advantageously also comprise the second guide element 29, which is fixed to the containment head 30 and is mounted on the bar 49.

Moreover, in both of these embodiments, the containment head 30 is slidably mounted along the bar 49, and the adjusting means 44 comprise selective catch means 62 associated with the containment head 30 for selectively allowing and inhibiting its sliding along the bar 49. As shown in FIG. 16, in the embodiments illustrated the selective catch means 62 comprise a threaded rod 63 screwed into the containment head 30 transversally to the main axis of extension of the bar 49, and designed to act by pressing against the surface of the bar 49. The threaded rod 63 is driven to rotate manually using a special handle 64.

Moving on to a more detailed description of device 1 operation, it allows facilitated web 5 reel 4 substitution.

Figure 3:
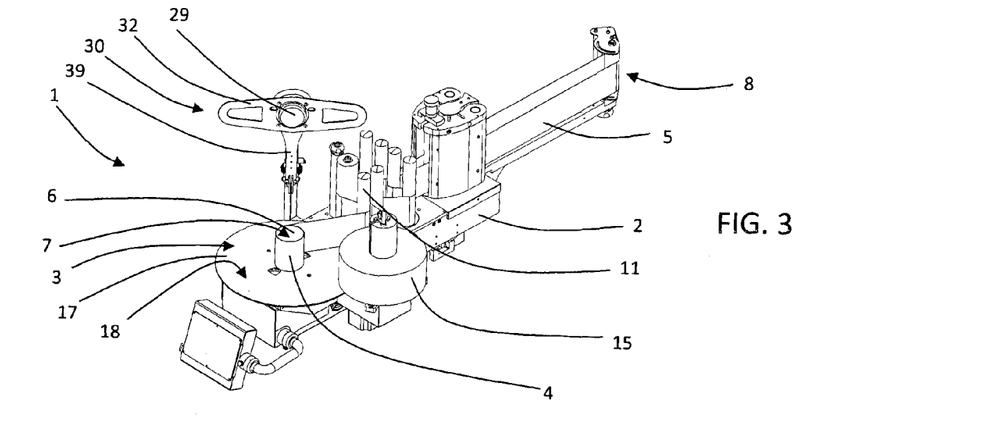
FIG. 3 shows the device of FIG. 2 in a second configuration.
Figure 4:
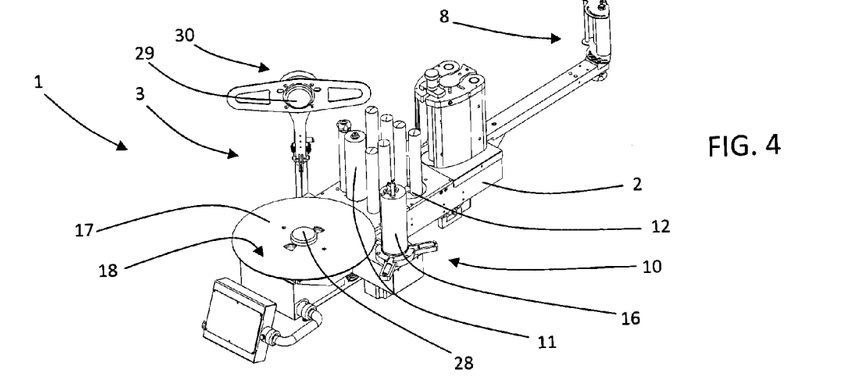
FIG. 4 shows the device of FIG. 3 in which the web and the reels have been removed.
Figure 5:
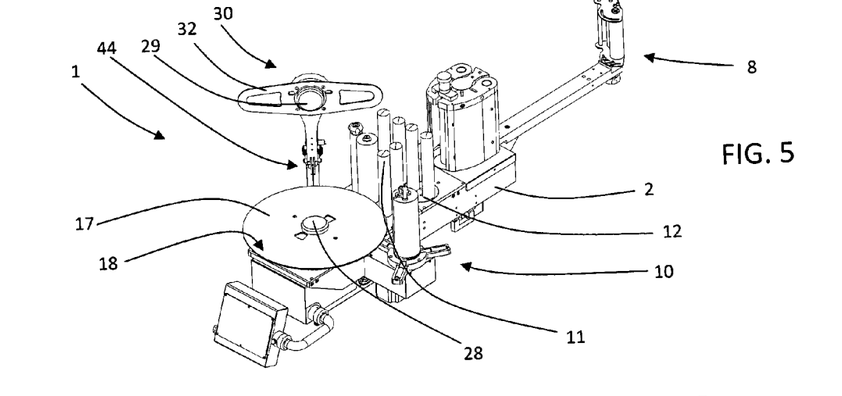
FIG. 5 shows the device of FIG. 4 in which the supporting plate for the reel to be unwound is lifted above the rest of the device and detached from it.
Figure 12:
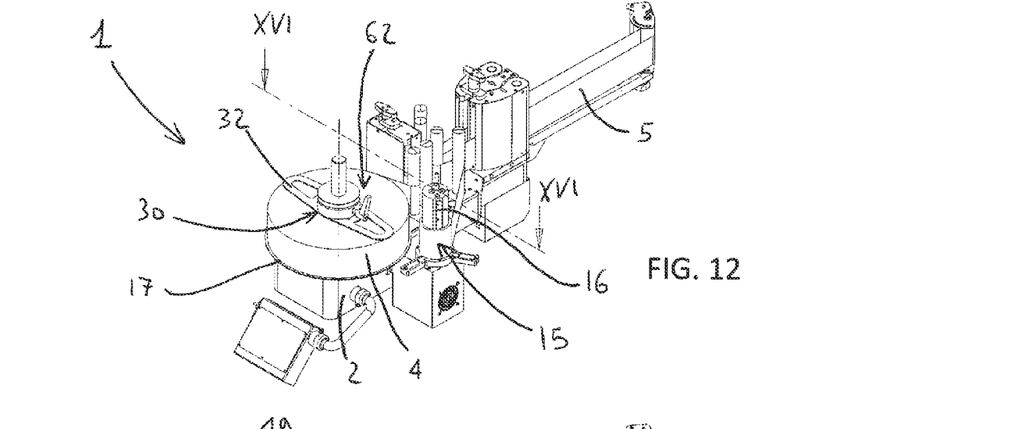
FIG. 12 is an axonometric top view of a device, according to a second embodiment of this invention, in a first configuration and with a reel of web being unwound and a recovery reel being rewound.
Figure 13:
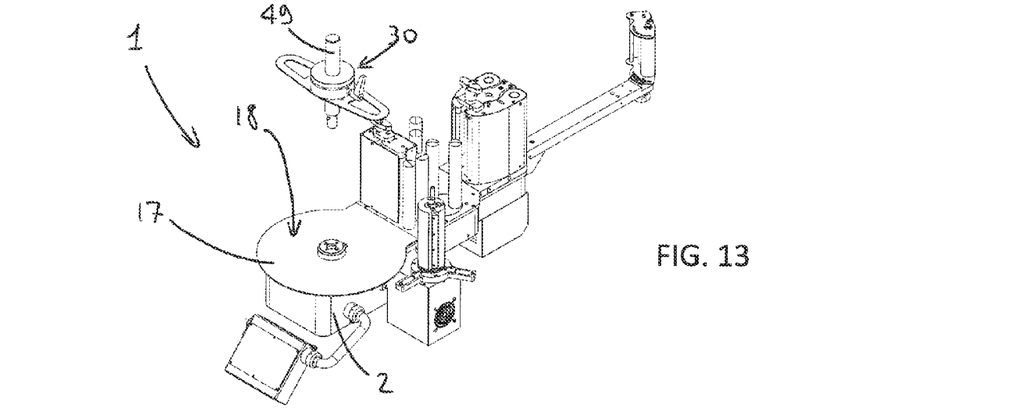
FIG. 13 shows the device of FIG. 12 in which the web and the reels have been removed.
Figure 14:
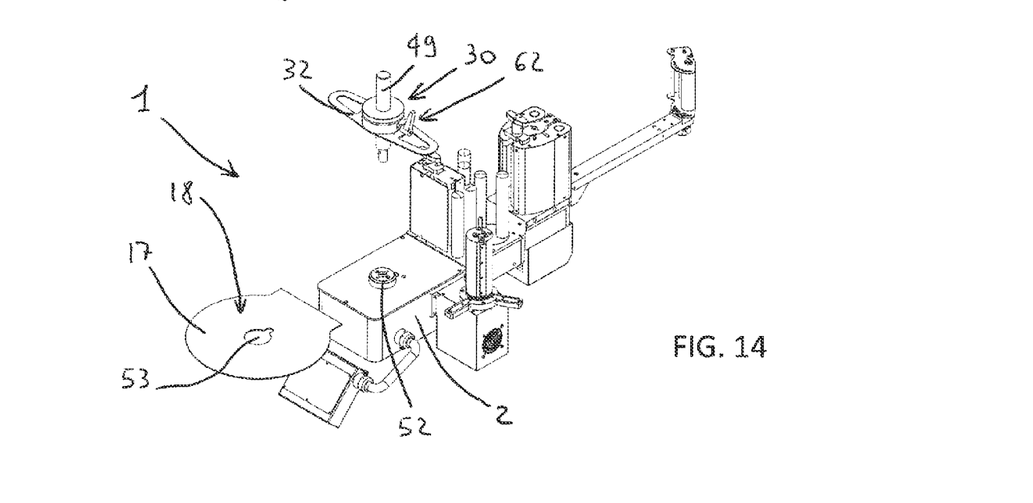
FIG. 14 shows the device of FIG. 12 in which the supporting plate for the reel to be unwound is lifted above the rest of the device and detached from it.

As FIGS. 1 and 12 clearly show, when the device 1 is operating, the reel 4 with labels is being unwound and a recovery reel 15 is being wound around the rewinding roller 16. As the reel 4 is gradually unwound, it is finished and has to be substituted (FIG. 2). Therefore, at least in the first two embodiments, the containment head 30 is moved from the operating configuration to the open configuration. As a result, in the first embodiment the arm 39 is brought from the second position to the first position (FIG. 3). In performing this action, when the device 1 is not operating, the operator rotates the arm 39. Alternatively, if the arm 39 is motor-driven, the operator may simply issue the command to make the arm 39 pass from the second position to the first position, directly from the control panel 48. In contrast, at least in the second embodiment, the operator unhooks the lower end 50 of the bar 49 from the housing 51 and pulls the bar 49 out of the central hole 7. That is also possible in the third embodiment, although in this case it is also alternatively possible to first remove the supporting plate 17 with the containment head 30 connected to it, and only afterwards to separate them. The recovery reel 15 is then removed from the rewinding roller 16 and the reel 4 winding element 6 (cylinder) can be removed from the supporting plate 17 and, in the embodiment illustrated, taken off the first guide element 28 (FIG. 4).

Figure 6:
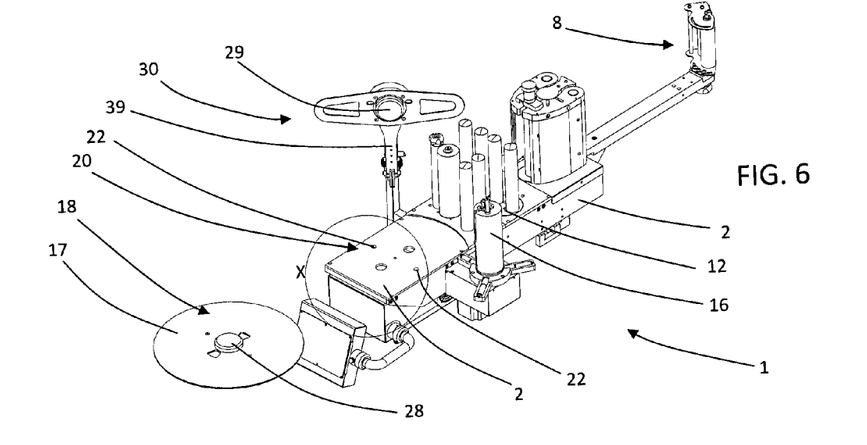
FIG. 6 shows the device of FIG. 5 in which the supporting plate for the reel to be unwound is distanced from the rest of the device.

At this point the supporting plate 17 can be removed and detached from the frame 2. For example, it may be lifted to cause uncoupling of the connecting means 19 (visible in FIG. 9) and the receiving means 20, as visible in FIG. 5. The supporting plate 17 can then be moved away from the frame 2 (FIG. 6). The operator (or person acting on his behalf) can then transport the supporting plate 17 to a preferred location, for example to a work bench, and place a new reel 4 (of web 5 with self-adhesive or "pressure sensitive" labels on it) on the sustaining surface 18 (FIG. 7). Alternatively another supporting plate 17 may already have been loaded with a new reel 4 and may already be ready for association with the frame 2. In the first and second embodiments positioning of the reel 4 at the sustaining surface 18 is guided and promoted by the presence of the first guide element 28 which is inserted at least in a part of the central hole 7 of the reel 4. At this point the supporting plate 17 is ready for association with the frame 2. Advantageously, the supporting plate 17 is positioned on the frame 2 and the connecting means 19 are coupled with the receiving means 20. Once the coupling is made, the containment head 30 is moved from the open configuration to the operating configuration, that is to say, in the first embodiment the arm 39 is brought from the first position to the second position (FIG. 1), whilst in the other embodiments the bar 49 is engaged in the housing 51 (however it should be noticed that in the third embodiment the bar 49 may also be fitted in the housing 51 before the supporting plate 17 is repositioned on the frame 2). During achievement of the operating configuration, the second guide element 29 is inserted in a part of the central hole 7 of the reel 4 and the contact element 32 substantially makes contact with the reel 4. If necessary the operator can, advantageously preliminarily, vary the distance between the containment head 30 and the sustaining surface 18, adapting the distance to the thickness of the reel 4. At this point the web 5 is unwound along the running path as far as the recovery means 10. The web 5 feeding means 9 are activated and the reel 4 starts unwinding again with a rotating movement (sliding on the sustaining surface 18, in the preferred embodiment) about the axis of rotation 24 (which in the preferred embodiment is defined by both of the guide elements, when the containment head 30 is in the operating position).

This invention brings important advantages.

The device according to this invention allows facilitated substitution of the reel of web with labels on it. In fact, the presence of the containment head, which may be switched between the open configuration and the operating configuration, allows the elimination of the presence of a rotation pin (mounted on the frame) which must be inserted from below in the central hole of a pierced supporting plate. That facilitates coupling of the supporting plate with the frame, since, especially in the first two embodiments, the operator can simply couple the supporting plate, carrying the new reel, without having to align both of the central holes of the reel itself and of the supporting plate so as to correctly insert the rotation pin in the holes. The presence of the containment head therefore makes it possible to avoid having a rotation pin associated with the frame, around which the supporting plate must be positioned. In that way, the containment head allows a reduction in the height to which the supporting plate must be lifted in order to couple it with the frame (that is to say, substantially equivalent to the length of the rotation pin). In addition, the absence of a rotation pin allows in the first and second embodiments the supporting plate to be coupled not just by lifting it and lowering it onto the frame, but also by translation and pushing of the supporting plate on the frame, for example thanks to the insertion guide means. In fact, in prior art devices the presence of the rotation pin does not allow such movement of the supporting plate on the frame. In contrast, in this invention the containment head can adopt the open configuration so that it does not in any way hinder coupling of the supporting plate with the frame by translation of the former on the latter. At the same time, during device operation, since the containment head can be put in the operating configuration, it allows the reel to be held between itself and the supporting plate, in any case allowing reel rotation.

Therefore, the operator can substitute the reel while avoiding lifting loads to unsuitable heights and thanks to the presence of the containment head he can move the supporting plate on the frame, for example thanks to the insertion guide means, with the further advantage that in that case precision in achieving coupling of the supporting plate with the frame is always guaranteed.

Moreover, since the supporting plate can be removed and detached from the frame, the operator can substitute the reel on the supporting plate when the latter is located in a more convenient position, for example on a work bench. That facilitates the work of the operator who can be more precise, reducing the risk while handling a new reel of causing it to accidentally come undone. The presence, in the first two embodiments illustrated, of the guide element associated with the supporting plate, prevents incorrect positioning of the reel and harmful reel translations on the sustaining surface during supporting plate transportation and coupling with the frame.

Finally, it should be noticed that this invention is relatively easy to produce and that even the cost linked to implementing the invention is not very high. The invention described above may be modified and adapted in several ways without thereby departing from the scope of the inventive concept. Moreover, all details of the invention may be substituted with other technically equivalent elements and the materials used, as well as the shapes and dimensions of the various components, may vary according to requirements.

The invention claimed is:

1. A device for feeding self-adhesive or "pressure sensitive" labels to a labelling machine comprising:
    a frame (2);
    supporting means (3), mounted on the frame (2), for supporting a reel (4) of web (5) on which self-adhesive or "pressure sensitive" labels are removably attached, the supporting means (3) in turn comprising a supporting plate (17) on top of which there is a substantially flat sustaining surface (18) on which in use the reel (4) can be placed, the supporting means (3) also comprising at least one guide element (28, 29) for the reel (4), the guide element (28, 29) defining an axis of rotation (24) for the reel (4) perpendicular to the sustaining surface (18) and being designed in use to be inserted at least in a part of a central hole (7) of the reel (4) for in use guiding reel rotation about the axis of rotation (24);
    a detaching station (8) for detaching the labels from the web (5), associated with the frame (2), the detaching station (8) being shaped and configured such that, when the web (5) passes through the detaching station (8), the labels detach from the web (5);
    feeding means (9) for feeding the web (5) to the detaching station (8), associated with the frame (2); and
    recovery means (10) for recovering web (5) without labels from the detaching station (8), associated with the frame (2);
the device comprising one or more rollers which define a running path for the web (5), at least a portion of the running path extending from the reel (4) to the feeding means (9) and then to the detaching station (8) and then to the recovery means (10), the device being shaped and configured such that the web (5) runs (a) from the reel (4) to the detaching station (8) where the labels detach from the web (5), and then (b) from the detaching station (8) to the recovery means (10) where the web (5) without labels is recovered;
    the supporting means (3) also comprising a containment head (30) switchable between an open configuration, and an operating configuration, in which it allows the reel (4) to be held between itself and the supporting plate (17), in any case allowing reel (4) rotation guided by the guide element (28, 29),
characterised in that the supporting plate (17) is removably associated with the frame (2), in that the containment head (30) in the open configuration in use allows coupling with and uncoupling from the frame (2) of the supporting plate (17) with the reel (4) placed at the sustaining surface (18), and in that the supporting means (3) comprise prevention means (23) for preventing rotation of the supporting plate (17), the reel (4) in use being able to rotate about the axis of rotation (24) by sliding on the sustaining surface (18).

2. The device according to claim 1, characterised in that in the open configuration the containment head (30) also allows, in use, the positioning on the supporting plate (17) and removal from the supporting plate (17) of a reel (4).

3. The device according to claim 1, characterised in that the supporting means (3) comprise a first guide element (28) operatively associated with the supporting plate (17), projecting from the sustaining surface (18) and designed in use to be inserted in the central hole (7) of the reel (4) on the side of the sustaining surface (18), and/or a second guide element (29) associated with the containment head (30) and designed to be inserted, when the containment head (30) is in the operating configuration, in the central hole (7) on the opposite side of the reel (4) to that where the sustaining surface (18) is located, the second guide element (29) defining the axis of rotation (24) only when it is in the operating configuration.

4. The device according to claim 3, characterised in that the housing (51) is formed by a linking element (52) fixed to the frame (2) and in use insertable in an opening (53) made at the centre of the supporting plate (17), in that the supporting means (3) comprise said first guide element (28), in that the linking element (52) constitutes the first guide element (28), and in that the first guide element (28) is designed to be inserted in the central hole (7) only for a stretch of a total length of the central hole less than half the length of the central hole (7) itself.

5. The device according to claim 3, characterised in that the housing (51) is formed by a linking element (52) fixed to the supporting plate (17) and in that the supporting means (3) comprise said first guide element (28), in that the linking element (52) constitutes the first guide element (28).

6. The device according to claim 1, characterised in that the supporting means (3) comprise connecting means (19) associated with the supporting plate (17), and in that it comprises, at the frame (2), receiving means (20) for receiving the connecting means (19), the connecting means (19) being couplable with and uncouplable from the receiving means (20), allowing the supporting plate (17) to be coupled with and uncoupled from the frame (2).

7. The device according to claim 6, characterised in that it also comprises insertion guide means (25), associated with the frame (2), for guiding a sliding of the connecting means (19) on the frame (2), at least during coupling with the receiving means (20).

8. The device according to claim 7, characterised in that the receiving means (20) form one or more seats (22) and in that the connecting means (19) comprise one or more connecting elements (21) which can be inserted in the one or more seats (22), the insertion guide means (25) forming on the frame (2) one or more guides (26) in each of which a different connecting element (21) can respectively slide until it reaches the respective seat (22), the seats (22), connecting elements (21) and guides (26) being present in equal numbers.

9. The device according to claim 6, characterised in that the connecting means (19) form the prevention means (23).

10. The device according to claim 1, characterised in that the supporting means (3) comprise adjusting means (44) for adjusting the distance of the containment head (30) from the sustaining surface (18) when the containment head (30) is in the operating position.

11. The device according to claim 10, characterised in that the supporting means (3) also comprise a bar (49) on which the containment head (30) is mounted, and which has a lower end (50) engagable in a housing (51) which is positioned at the centre of the supporting plate (17) at least when the supporting plate (17) is associated with the frame (2), said bar (49) in use being insertable in the central hole (7) in the reel (4) for reaching the housing (51), and in that the containment head (30) is slidably mounted along the bar (49) and in that the adjusting means (44) comprise selective catch means (62) associated with the containment head (30) for selectively allowing and inhibiting its sliding along the bar (49).

12. The device according to claim 1, characterised in that the containment head (30) comprises a contact element (32), said contact element (32), when the containment head (30) is in the operating configuration, being parallel with the sustaining surface (18) and distanced from it so that, in use, it contains the reel (4) between itself and the sustaining surface (18), substantially preventing reel (4) movements along a line perpendicular to the sustaining surface (18), but at the same time leaving the reel free to rotate.

13. The device according to claim 1, characterised in that the containment head (30) is connected to the frame (2) and is movable relative to it between an open position and an operating position, the open configuration corresponding to the open position and the operating configuration corresponding to the operating position.

14. The device according to claim 13, characterised in that the supporting means (3) also comprise an arm (39) associated with the frame (2) and supporting the containment head (30), the arm (39) being movable relative to the frame (2) between a first position in which the containment head (30) is in the open position, and a second position in which the containment head (30) is in the operating position.

15. The device according to claim 14, characterised in that the supporting means (3) comprise adjusting means (44) for adjusting the distance of the containment head (30) from the sustaining surface (18) when the containment head (30) is in the operating position and in that the height adjusting means (44) are associated between the frame (2) and the arm (39).

16. The device according to claim 15, characterised in that the adjusting means (44) comprise a rod (42) associated with the frame (2) and substantially perpendicular to the sustaining surface (18), and a sliding element (45) slidably associated with the rod (42) and movable along the rod (42), the sliding element (45) supporting the arm (39).

17. The device according to claim 1, characterised in that when the containment head (30) is in the operating configuration it is connected to the frame (2) and when it is in the open configuration it is disconnected from the frame.

18. The device according to claim 17, characterised in that the supporting means (3) also comprise a bar (49) on which the containment head (30) is mounted, and which has a lower end (50) engagable in a housing (51) which is positioned at the centre of the supporting plate (17) at least when the supporting plate (17) is associated with the frame (2), said bar (49) in use being insertable in the central hole (7) in the reel (4) for reaching the housing (51).

19. The device according to claim 18, characterised in that the housing (51) is formed by a linking element (52) fixed to the frame (2) and in use insertable in an opening (53) made at the centre of the supporting plate (17).

20. The device according to claim 18, characterised in that the housing (51) is formed by a linking element (52) fixed to the supporting plate (17).

21. The device according to claim 18, characterised in that the supporting means (3) comprise a first guide element (28) operatively associated with the supporting plate (17), projecting from the sustaining surface (18) and designed in use to be inserted in the central hole (7) of the reel (4) on the side of the sustaining surface (18), and/or a second guide element (29) associated with the containment head (30) and designed to be inserted, when the containment head (30) is in the operating configuration, in the central hole (7) on the opposite side of the reel (4) to that where the sustaining surface (18) is located, the second guide element (29) defining the axis of rotation (24) only when it is in the operating configuration, and characterised in that the supporting means (3) comprise said second guide element (29) and in that the second guide element (29) is mounted on the bar (49).

22. The device according to claim 18, characterised in that the lower end (50) of the bar (49) is fixable to the housing (51) by means of a bayonet connector.

23. The device according to claim 1, characterised in that in its operating configuration the containment head (30) can be coupled with the frame (2), and uncoupled from the frame (2), together with the supporting plate (17).

24. A labelling machine comprising a device for feeding self-adhesive or "pressure sensitive" labels, wherein the device for feeding self-adhesive or "pressure sensitive" labels comprises:

a frame (2);

supporting means (3), mounted on the frame (2), for supporting a reel (4) of web (5) on which self-adhesive or "pressure sensitive" labels are removably attached, the supporting means (3) in turn comprising a supporting plate (17) on top of which there is a substantially flat sustaining surface (18) on which in use the reel (4) can be placed, the supporting means (3) also comprising at least one guide element (28, 29) for the reel (4), the guide element (28, 29) defining an axis of rotation (24) for the reel (4) perpendicular to the sustaining surface (18) and being designed in use to be inserted at least in a part of a central hole (7) of the reel (4) for in use guiding reel rotation about the axis of rotation (24);

a detaching station (8) for detaching the labels from the web (5), associated with the frame (2), the detaching station (8) being shaped and configured such that, when the web (5) passes through the detaching station (8), the labels detach from the web (5); during operation at the detaching station (8) labels leaving the device (1) and being passed on to another part of the labelling machine;

feeding means (9) for feeding the web (5) to the detaching station (8), associated with the frame (2); and recovery means (10) for recovering web (5) without labels from the detaching station (8), associated with the frame (2);

the device comprising one or more rollers which define a running path for the web (5), at least a portion of the running path extending from the reel (4) to the feeding means (9) and then to the detaching station (8) and then to the recovery means (10), the device being shaped and configured such that the web (5) runs (a) from the reel (4) to the detaching station (8) where the labels detach from the web (5), and then (b) from the detaching station (8) to the recovery means (10) where the web (5) without labels is recovered;

the supporting means (3) also comprising a containment head (30) switchable between an open configuration, and an operating configuration, in which it allows the reel (4) to be held between itself and the supporting plate (17), in any case allowing reel (4) rotation guided by the guide element (28, 29), characterised in that the supporting plate (17) is removably associated with the frame (2), in that the containment head (30) in the open configuration in use allows coupling with and uncoupling from the frame (2) of the supporting plate (17) with the reel (4) placed at the sustaining surface (18), and in that the supporting means (3) comprise prevention means (23) for preventing rotation of the supporting plate (17), the reel (4) in use being able to rotate about the axis of rotation (24) by sliding on the sustaining surface (18).

* * * * *